(12) United States Patent
Raman et al.

(10) Patent No.: US 11,062,014 B1
(45) Date of Patent: Jul. 13, 2021

(54) DYNAMIC CHALLENGE QUESTION-BASED AUTHENTICATION

(71) Applicant: RSA Security LLC, Bedford, MA (US)

(72) Inventors: Haim Raman, Netanya (IL); Tamar Vardy, Tel Aviv (IL); Adi Peer, Petach Tikva (IL); Aviram Shterenbaum, Kiryat Bialik (IL); Karin Daches, Tel Aviv (IL); Itzik Sorani, Kadima (IL)

(73) Assignee: RSA Security LLC, Bedford, MA (US)

( * ) Notice: Subject to any disclaimer, the term of this patent is extended or adjusted under 35 U.S.C. 154(b) by 290 days.

(21) Appl. No.: 15/883,704

(22) Filed: Jan. 30, 2018

(51) Int. Cl.
G06F 21/36 (2013.01)
G06N 7/02 (2006.01)

(52) U.S. Cl.
CPC ............ *G06F 21/36* (2013.01); *G06N 7/023* (2013.01); *G06F 2221/2103* (2013.01)

(58) Field of Classification Search
CPC ............ G06F 21/36; G06F 2221/2103; G06F 3/0481; G06F 21/31; G06F 21/316; G06N 7/023; H04L 63/08; H04L 63/10; H04W 12/12
See application file for complete search history.

(56) References Cited

U.S. PATENT DOCUMENTS

| | | | | |
|---|---|---|---|---|
| 8,930,709 | B2 * | 1/2015 | Navratil | G06F 21/31 713/186 |
| 9,813,402 | B1 * | 11/2017 | Chen | G06F 21/31 |
| 10,362,016 | B2 * | 7/2019 | Hwang | G06F 21/31 |
| 2012/0072975 | A1 * | 3/2012 | Labrador | G06F 21/31 726/6 |
| 2016/0182481 | A1 | 6/2016 | Audsin et al. | |
| 2016/0380941 | A1 | 12/2016 | Tanurdjaja et al. | |
| 2017/0201521 | A1 * | 7/2017 | Bruno | H04L 63/0861 |
| 2018/0205727 | A1 * | 7/2018 | Hwang | G06F 21/31 |
| 2019/0158477 | A1 * | 5/2019 | Nagaratnam | G06F 21/31 |

OTHER PUBLICATIONS

Newman, L.H., Wired, "Time to Kill Security Questions—Or Answer Them with Lies," Sep. 28, 2016.
IDology, Dynamic KBA, https://www.idology.com/identity-verification-solutions/dynamic-kba/, Jul. 5, 2017.

* cited by examiner

*Primary Examiner* — Kevin Bechtel
*Assistant Examiner* — Sangseok Park
(74) *Attorney, Agent, or Firm* — Danielson Legal LLC (57) ABSTRACT

Techniques for generating dynamic challenge questions for use in an authentication process are provided herein. An example computer-implemented method can include outputting a first prompt to a user via a user device interface, wherein the first prompt comprises a first set of information-gathering questions; generating dynamic challenge questions for use in an authentication process, wherein the dynamic challenge questions are generated based on user responses to the first set of information-gathering questions; generating a second prompt in connection with an authentication request, wherein the second prompt is based at least in part on at least one of the dynamic challenge questions; processing a user response to the at least one dynamic challenge question, wherein said processing comprises determining a likelihood that the user response matches an automatically estimated response; and resolving the authentication request based on the processing.

20 Claims, 6 Drawing Sheets

DYNAMIC CHALLENGE QUESTION-BASED AUTHENTICATION

FIELD

The field relates generally to information processing systems, and more particularly to authentication techniques in such systems.

BACKGROUND

In order to gain access to applications or other resources via a computer or another user device, users are often required to authenticate themselves by entering authentication information. Such authentication information may include, for example, passwords, responses to one or more challenge questions, or other forms of cryptographic or authentication information. In a conventional challenge-response system, a system-generated query is presented to a user, and the user inputs a response, which is then compared to a stored set of responses previously-provided by the user.

However, such conventional approaches re-use the same static set of questions and answers over multiple iterations, thereby creating the potential for security vulnerabilities. Additionally, such approaches that change or update challenge questions, do so infrequently. Moreover, with such approaches, users commonly utilize the same sets of static challenge questions and responses across multiple sites and platforms, thereby expanding the scope of the potential security vulnerabilities.

SUMMARY

Illustrative embodiments of the invention provide techniques for generating dynamic challenge questions for use in authentication processes.

In one embodiment, an exemplary computer-implemented method can include outputting a first prompt to a user via at least one user device interface, wherein the first prompt comprises a first set of one or more information-gathering questions, wherein user responses to the first set of one or more information-gathering questions are unknown. Such a method can also include generating one or more dynamic challenge questions for use in an authentication process involving the user, wherein the one or more dynamic challenge questions are generated based on one or more user responses to the first set of one or more information-gathering questions, and generating a second prompt via the at least one user device interface in connection with an authentication request by the user to access a protected resource associated with the user device, wherein the second prompt is based at least in part on at least one of the one or more dynamic challenge questions. Additionally, such a method can also include processing at least one user response entered via the user device interface in response to the at least one dynamic challenge question, wherein said processing comprises determining a likelihood that the at least one user response matches at least one automatically estimated response, and resolving the authentication request based on said processing.

Illustrative embodiments can provide significant advantages relative to conventional static challenge-response systems. For example, challenges associated with repeated re-use of challenge questions are overcome through the dynamic generation of distinct challenge questions for each authentication process, wherein such challenge questions are dynamically generated based on user-provided information as well as user responses to previous dynamic challenge questions. One or more embodiments of the invention additionally include advantages with respect to user privacy, as such embodiments preclude a need to access data sources outside of the user-provided information in response to information-gathering and dynamic challenge questions.

These and other illustrative embodiments described herein include, without limitation, methods, apparatus, systems, and computer program products comprising processor-readable storage media.

DETAILED DESCRIPTION

Illustrative embodiments of the present invention will be described herein with reference to exemplary computer networks and associated computers, servers, network devices or other types of processing devices. It is to be appreciated, however, that the invention is not restricted to use with the particular illustrative network and device configurations shown. Accordingly, the term "computer network" as used herein is intended to be broadly construed, so as to encompass, for example, any system comprising multiple networked processing devices.

Figure 1:
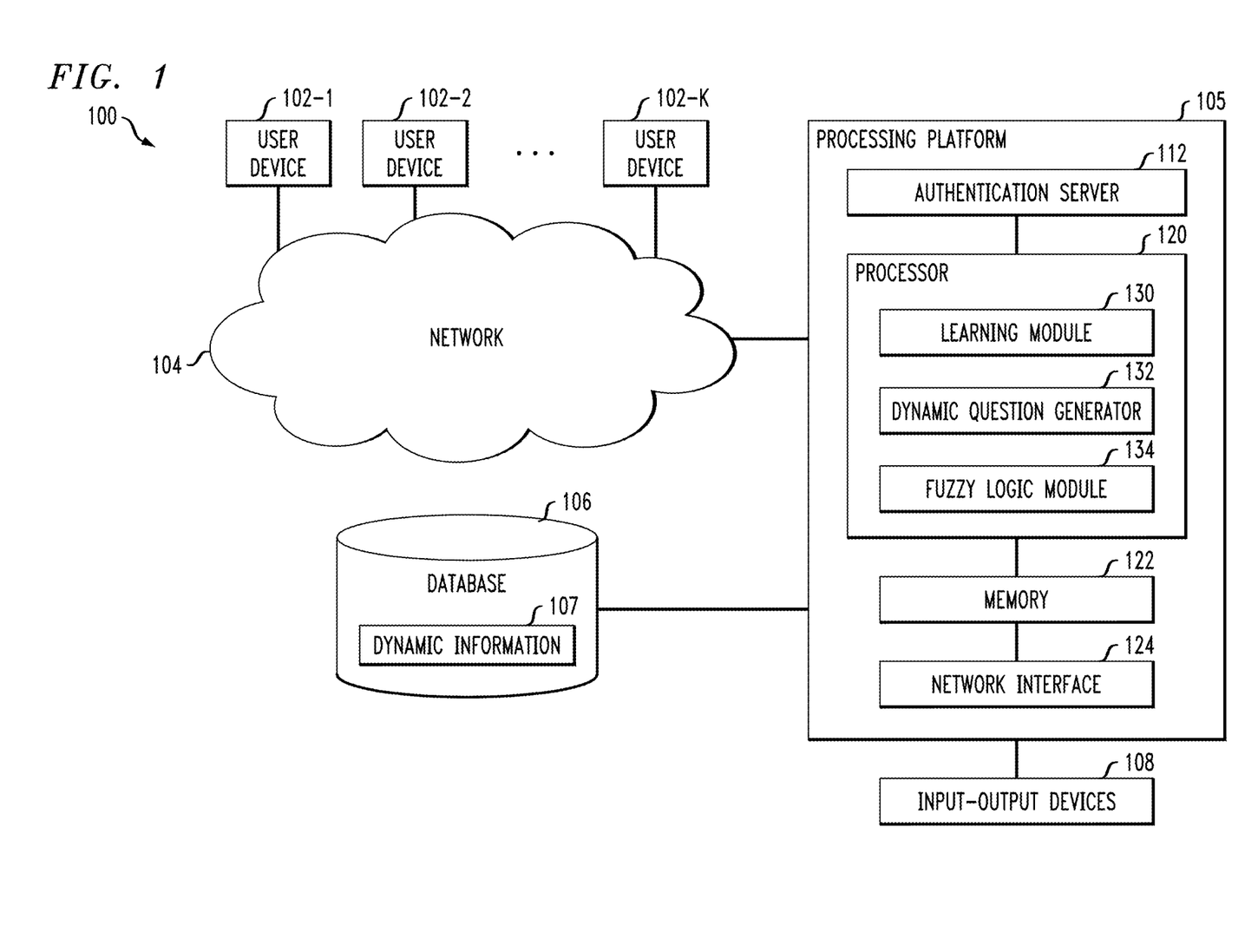
FIG. 1 shows an information processing system configured for generating dynamic challenge questions in an illustrative embodiment of the invention.

FIG. 1 shows a computer network 100 configured in accordance with an illustrative embodiment of the invention. The computer network 100 comprises a plurality of user devices 102-1, 102-2, . . . 102-K, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to the network 104 is a processing platform 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

The processing platform 105 has an associated database 106 configured to store dynamic information 107 derived from user responses to dynamically-generated challenge questions.

The database 106 in the present embodiment is implemented using one or more storage systems associated with the processing platform 105. Such storage systems can comprise any of a variety of different types of storage including, for example, network-attached storage (NAS), storage area networks (SANs), direct-attached storage (DAS) and distributed DAS, as well as combinations of these and other storage types, including software-defined storage.

Also associated with processing platform 105 are input-output devices 108, which illustratively comprise keyboards, displays or other types of input-output devices in any combination. Such input-output devices are used to support one or more user interfaces to the processing platform 105, as well as to support communication between the processing platform 105 and other related systems and devices not explicitly shown.

Figure 2:
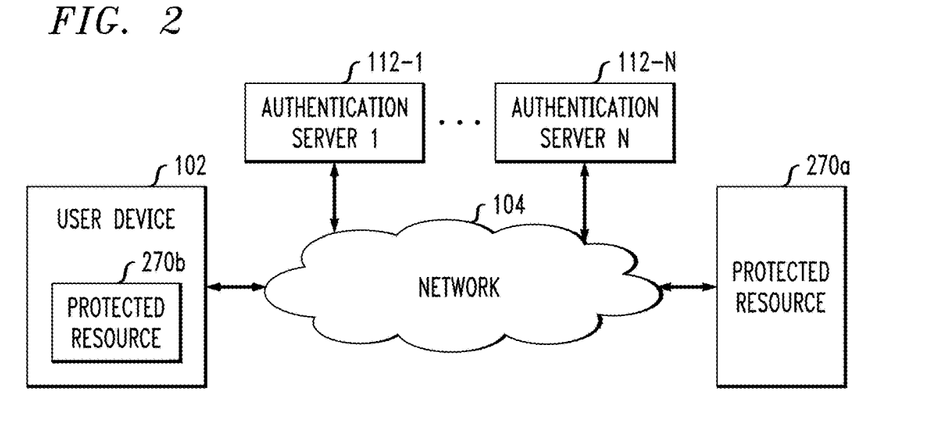
FIG. 2 shows another information processing system configured for generating dynamic challenge questions in an illustrative embodiment of the invention.

In one or more embodiments of the invention (such as the example embodiment depicted in FIG. 1), the processing platform 105 comprises an authentication server 112. Authentication events, such as dynamically generated challenge question prompts, initiated at respective ones of the user devices 102 are directed to the authentication server 112 over the network 104 for processing. The authentication server 112 can determine if a given access attempt is authentic in conjunction with fuzzy logic module 134 of processor 120, based on the determined likelihood of plausibility or matching with an estimated response of the user response to a dynamic challenge question. Upon verification of the presented authentication factors, the authentication server 112 grants the requesting user device 102 access to one or more protected resources of the computer network 100 (such as further depicted in FIG. 2, for example). Although shown as an element of the processing platform 105 in this embodiment, the authentication server 112 in other embodiments (such as depicted in FIG. 2, for example) can be implemented at least in part externally to the processing platform 105, for example, as a stand-alone server, set of servers or other type of authentication system coupled to the network 104.

The processing platform 105 in the FIG. 1 embodiment is assumed to be implemented using at least one processing device. Each such processing device generally comprises at least one processor and an associated memory, and implements one or more functional modules for controlling certain features of the processing platform 105.

More particularly, the processing platform 105 in this embodiment comprises a processor 120 coupled to a memory 122 and a network interface 124.

The processor 120 illustratively comprises a microprocessor, a microcontroller, an application-specific integrated circuit (ASIC), a field-programmable gate array (FPGA) or other type of processing circuitry, as well as portions or combinations of such circuitry elements.

The memory 122 illustratively comprises random access memory (RAM), read-only memory (ROM) or other types of memory, in any combination. The memory 122 and other memories disclosed herein may be viewed as examples of what are more generally referred to as "processor-readable storage media" storing executable computer program code or other types of software programs.

One or more embodiments of the invention include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals.

The network interface 124 allows the processing platform 105 to communicate over the network 104 with the user devices 102, and illustratively comprises one or more conventional transceivers.

The processor 120 further comprises a learning module 130, a dynamic question generator 132, and a fuzzy logic module 134.

It is to be appreciated that this particular arrangement of modules 130, 132, and 134 illustrated in the processor 120 of the FIG. 1 embodiment is presented by way of example only, and alternative arrangements can be used in other embodiments. For example, the functionality associated with the modules 130, 132, and 134 in other embodiments can be combined into a single module, or separated across a larger number of modules. As another example, multiple distinct processors can be used to implement different ones of the modules 130, 132, and 134 or portions thereof.

At least portions of the learning module 130, dynamic question generator 132, and fuzzy logic module 134 may be implemented at least in part in the form of software that is stored in memory 122 and executed by processor 120. Similarly, at least portions of the authentication server 112 of the processing platform 105 can be implemented at least in part in the form of software that is stored in memory 122 and executed by processor 120.

It is to be understood that the particular set of elements shown in FIG. 1 for automatically generating dynamic challenge questions for use in authentication processes involving user devices 102 of computer network 100 is presented by way of illustrative example only, and in other embodiments additional or alternative elements may be used. Thus, another embodiment may include additional or alternative systems, devices and other network entities, as well as different arrangements of modules and other components.

By way of example, in other embodiments, the processing platform 105 can be eliminated and associated elements such as authentication server 112, learning module 130, dynamic question generator 132, and fuzzy logic module 134 can be implemented elsewhere in the computer network 100.

An exemplary process utilizing learning module 130, dynamic question generator 132, and fuzzy logic module 134 of the processing platform 105 in computer network 100 will be described in more detail with reference to the flow diagrams of FIG. 5 and FIG. 6.

FIG. 2 is a system diagram of an illustrative embodiment of the invention. By way of illustration, FIG. 2 depicts an alternative embodiment to FIG. 1, wherein the authentication server(s) 112 is/are not resident on the processing platform 105 or user device(s) 102, but rather are separate devices. Accordingly, as depicted in FIG. 2, user device 102 communicates with a protected resource 270a over network 104. As detailed further below, at least one embodiment of the invention can also include a user device 102 that includes a protected resource 270b residing thereon. In an example implementation, a user authenticates online with one or more authentication servers 112-1 through 112-N (hereinafter, collectively referred to as authentication servers 112) before obtaining access to protected resource 270a and/or 270b (hereinafter, collectively referred to as protected resource 270 unless otherwise specified).

According to one aspect of the invention, as noted above, the user of the user device 102 is authenticated by authentication servers 112 using a password, challenge questions and related user-responses, and/or other forms of cryptographic information. The exemplary communications among the system elements 102, 104 and 270 of FIG. 2 employed to achieve authentication by the authentication servers 112 are discussed further below.

It is to be appreciated that a given embodiment of the disclosed system may include multiple instances of user device 102 and protected resource 270, and possibly other system components, although only single instances of such components are shown in the simplified system diagram of FIG. 2 for clarity of illustration.

As noted herein, user device 102 may represent a portable device, such as a mobile telephone, personal digital assistant (PDA), wireless email device, game console, etc. The user device 102 may alternatively represent a desktop or laptop personal computer (PC), a microcomputer, a workstation, a mainframe computer, a wired telephone, a television set top box, or any other information processing device which can benefit from the use of authentication techniques in accordance with the invention.

The user device 102 may also be referred to herein as simply a "user." The term "user," as used in this context, should be understood to encompass, by way of example and without limitation, a user device, a person utilizing or otherwise associated with the device, or a combination of both. An operation described herein as being performed by a user may therefore, for example, be performed by a user device, a person utilizing or otherwise associated with the device, or by a combination of both the person and the device. Similarly, a password, challenge question, or other cryptographic information described as being associated with a user may, for example, be associated with a user device 102, a person utilizing or otherwise associated with the device, or a combination of both the person and the device.

As also depicted in FIG. 2, the authentication servers 112 can be associated with a third party entity, such as an authentication authority, that processes authentication requests on behalf of web servers and other resources, as well as verifies the cryptographic information that is presented by a user device 102.

Further, the protected resource 270 may be, for example, an access-controlled application, web site or hardware device. In other words, a protected resource 270 is a resource that grants user access responsive to an authentication process, as will be described in greater detail below. For example, protected resource 270a may include an access controlled file, e-mail, a protected application, a remote application server such as a web site or other software program or hardware device that is accessed by the user device 102 over a network 104.

Additionally, in at least one embodiment of the invention, protected resource 270b can include one or more applications or data residing on the user device 102 itself. For example, such a protected resource 270b can include access to a mobile data management container for launching applications on the user device 102 (such as a mobile device), which can be protected requiring authentication in order to run the application(s) protected by the container. Further, protected resource 270b could also include an access controlled file, e-mail, a protected application, a remote application server such as a web site or other software program or hardware device that is accessed by the user device 102 over network 104. Similarly, it is possible that in order to unlock the mobile platform to perform operations, a successful authentication might be required.

Figure 3:
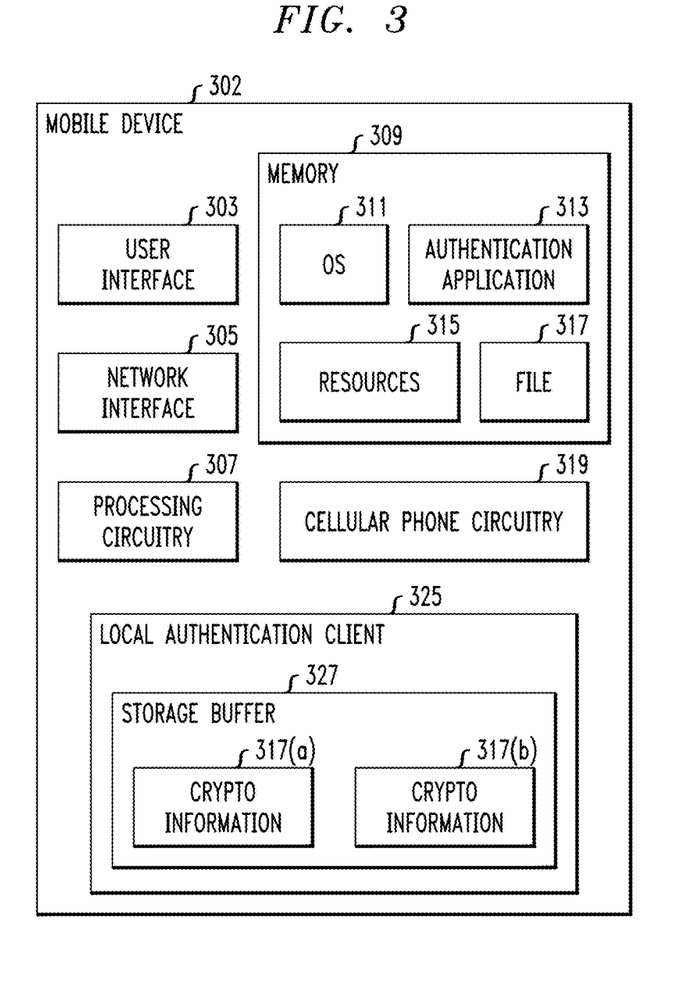
FIG. 3 is a system diagram of an exemplary mobile device on which at least one embodiment of the invention can be implemented.

FIG. 3 is a system diagram of an exemplary mobile device 302 on which at least one embodiment of the invention can be implemented. By way of illustration, FIG. 3 depicts a network interface 305 of the mobile device 302 configured to connect the mobile device 302 to a communications medium such as, for example, Wi-Fi and/or cellular telephony. Accordingly, the network interface 305 enables the mobile device 302 to communicate with the other components of an electronic environment. Additionally, the mobile device 302 includes a user interface 303 configured to receive user input and provide user output, such as a data file and/or data file location selection(s), such as described herein. One or more embodiments of the invention can include components such as a display screen, a capacitive touch display, and a push-button keyboard implemented for use in connection with the user interface 303.

Additionally, for completeness, cellular phone circuitry 319 within mobile device 302 allows the user to establish cellular phone calls with other callers having remote devices, as would be appreciated by one skilled in the art.

The memory 309 of mobile device 302 is configured to store one or more software constructs including, for example, an operating system 311, an authentication application 313, data for protected resources 315 (documents, restricted applications, etc.), a cryptographic information file 317, as well as other suitable or relevant material. Further, the processing circuitry 307 of mobile device 302 is configured to operate in accordance with the software constructs stored in the memory 309. By way of example, when the processing circuitry 307 runs the operating system 311, the processing circuitry 307 provides a secure electronic platform on which a user is able to carry out work. Such an electronic platform is capable of operating, for example, as a container to protect data and requiring user authentication before permitting access. Further, when the processing circuitry 307 runs the authentication application 313, the processing circuitry 307 communicates with the local authentication client 325 in a secure manner, for example, to obtain cryptographic information 317(a), 317(b), etc. from storage buffer 327, as additionally described herein.

It should be appreciated that the processing circuitry 307 can include one or more processors running specialized software components, such as detailed in connection with the techniques detailed herein and further depicted in FIG. 4.

In at least one embodiment of the invention, once the mobile device 302 is able to obtain valid cryptographic information, the user of the mobile device 302 is able to perform local user authentication to access protected resources. Accordingly, as noted, the mobile device 302 is provisioned with the authentication application 313 and cryptographic information file 317 holding cryptographic information to be used in connection with an authentication process. For example, and as further detailed herein, such cryptographic information within cryptographic information file 317 can include one or more estimated responses to automatically generated dynamic challenge questions and/or can include one or more stored items of information that will allow the system to estimate if a submitted response is truthful and/or accurate. As further described herein, such cryptographic information can be learned and updated over time (in conjunction, for example, with fuzzy logic such as depicted in module 134 in FIG. 1).

Consequently, the processing circuitry 307 of the mobile device 302 can perform a local authentication operation using cryptographic information file 317 stored in the memory 309. In at least one embodiment of the invention the processing circuitry 307 runs the authentication application 313, which directs the user of the mobile device 302, via the user interface 303, to enter cryptographic information (such as, for example, responses to automatically generated dynamic challenge questions) which is captured as one or more input elements 317(a), 317(b), etc. While the captured cryptographic information 317(a), 317(b), etc. are temporarily stored in the storage buffer 327 of the local authentication client 325, the authentication application 313 compares the captured user-provided cryptographic information 317(a), 317(b), etc. with the estimated responses in file 317 to determine a likelihood of a match and/or plausibility of the user-provided responses.

If a match or otherwise positive resolution is determined via this comparison, the authentication application 313 permits the user to access a protected resource (such as, for example, data in association with element 315 that are stored in the memory 309).

Figure 4:
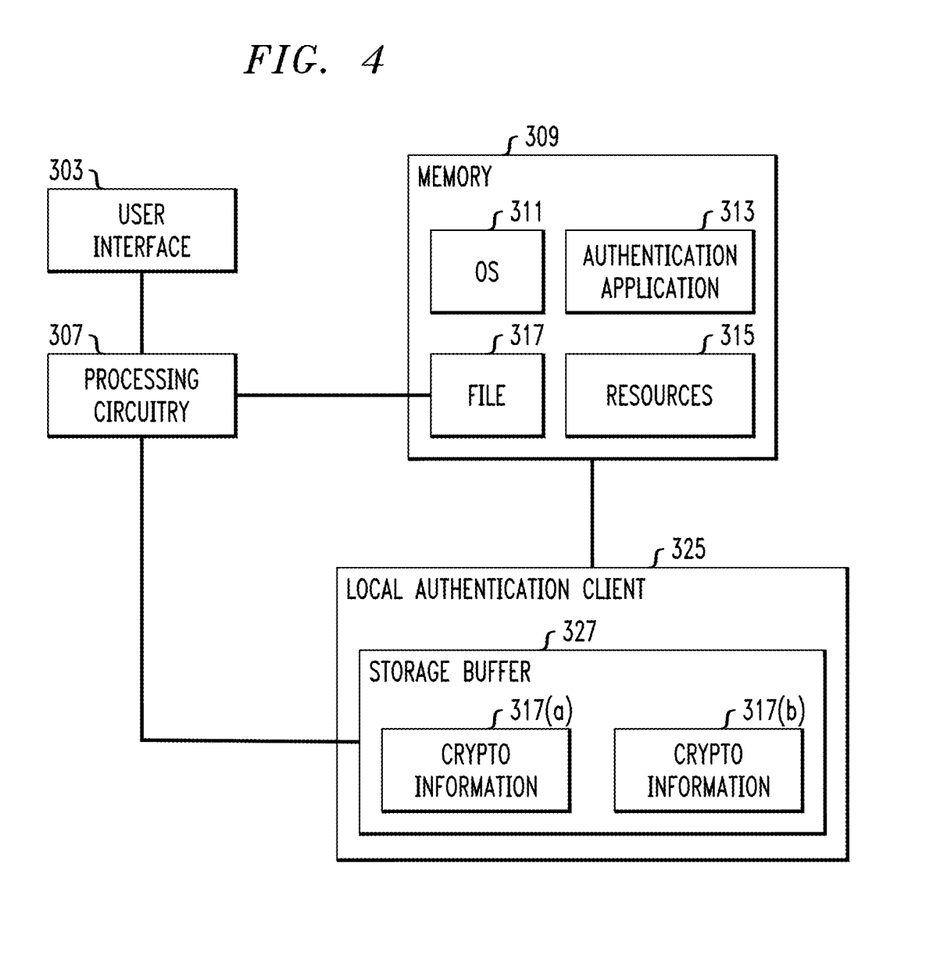
FIG. 4 is a system diagram of exemplary mobile device components, in accordance with at least one embodiment of the invention.

FIG. 4 is a system diagram of exemplary mobile device components, in accordance with at least one embodiment of the invention. As depicted in FIG. 4, a user can enter cryptographic information via user interface 303. This entered cryptographic information is captured as one or more input elements 317(a), 317(b), etc. Such input elements can include, as noted above, user-responses to automatically generated dynamic challenge questions and/or user-responses to information-gathering questions.

Accordingly, the captured one or more input elements 317(a), 317(b), etc. can be stored in cryptographic information file 317 to be subsequently used in conjunction with fuzzy logic to carry out an authentication process and/or in automatically generating one or more additional dynamic challenge questions.

Consequently, a corresponding cryptographic flow (carried out, for example, by authentication application 313 as run by operating system 311) can take the following exemplary form. The user is prompted (via user interface 303) to enter cryptographic information (such as a user-response to one or more dynamic challenge questions) in connection with an authentication request to access a protected resource associated with the mobile device (for example, the user wishes to access and/or unlock his or her smart phone). The entered cryptographic information is captured by the processing circuitry 307 as one or more input elements 317(a), 317(b), etc., and 317(a), 317(b), etc. are temporarily stored in the storage buffer 327 of the local authentication client 325.

Subsequently, the authentication application 313 compares the captured user-provided cryptographic information 317(a), 317(b), etc. with the estimated responses in file 317 stored in memory 309 to determine a likelihood of a match and/or plausibility of the user-provided responses. If the user-entered input elements 317(a), 317(b), etc. are deemed to be matching and/or plausible, authentication is deemed successful and the user is granted access to the protected resource in question.

As described herein, conventional challenge-response systems commonly present security vulnerabilities. Accordingly, at least one embodiment of the invention includes automatically generating dynamic challenge questions by learning behavioral and personal facts pertaining to the user, and dynamically building questions based on the continually growing and/or evolving collection of dynamic user information. Following successful authentication, additional dynamic information can be incorporated from the user-responses to a learning mechanism for use in generating subsequent and/or additional dynamic challenge questions.

By way merely of illustration, consider the following example use case, wherein a user enrolls in a dynamic challenge-response system. While enrolling, the user supplies the following information in response to an initial set of information-gathering questions: 1) my parents live in Italy; 2) I plan on visiting my parents during the summer; 3) I went on a ski trip with my best friend; 4) My best friend's name is Jon; and 5) I take dancing lessons.

In accordance with this example use case, one or more embodiments of the invention can include prompting the user to answer the following questions:

Where are you going to travel this summer? (User answer: North Italy)

What is the name of the person with whom you went on a ski trip? (User answer: Jon Doe)

What is the name of your dancing instructor? (This is a new information-gathering question for which the system does not have an answer; User answer: Jane Smith)

In the case wherein the user was successfully authenticated, the learning module/mechanism of the system will learn the following new information pertaining to the user: the user's best friend's last name (Doe), the user's parents' house location in Italy (North Italy), and the user's dancing instructor's name (Jane Smith). Accordingly, in at least one embodiment of the invention, the following example future dynamic challenge questions can be generated:

What is the last name of your best friend?

In which part of Italy do your parents live?

As also described herein, in one or more embodiments of the invention, authentication includes using fuzzy logic to recognize that a user response is correct and/or plausible (or matches an estimated response automatically generated by the system).

Figure 5:
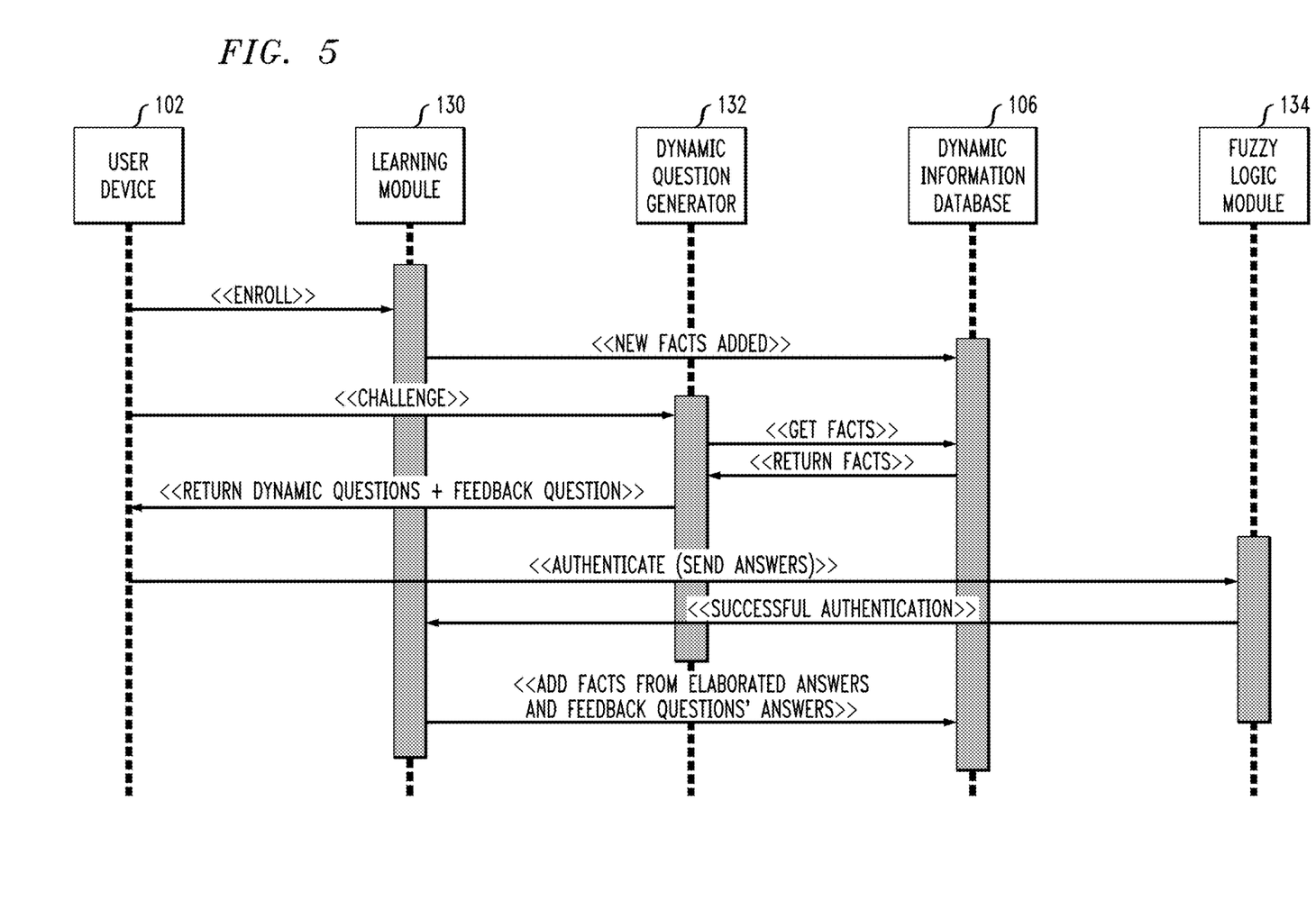
FIG. 5 is a flow diagram of a process for generating dynamic challenge questions for use in authentication processes in an illustrative embodiment.

FIG. 5 is a flow diagram of a process for automatically generating dynamic challenge questions for use in an authentication process in an illustrative embodiment. As depicted in FIG. 5, the user 102 enrolls in the dynamic question authentication by answering a set of initial information-gathering questions via the learning module 130. The user's answers are sent as new information/facts to the dynamic information database (DB) 106. Additionally, in an authentication request (that is, a challenge) from the user 102, the dynamic question generator 132 uses the dynamic information database 106 to automatically generate one or more dynamic questions for the user 102. Also, the user 102 will also receive, from the dynamic question generator 132, one or more new information-gathering/feedback questions for which the system does not yet have answers.

In attempting to authenticate, the user 102 will answer the questions provided by the dynamic question generator 132, and the fuzzy logic module 134 is implemented to determine and/or recognize a match or a likelihood thereof between the user responses and the stored information. The user's answer may include both a direct answer to the challenge question as well as one or more new items of information for the system to consider. Referring to the above-noted example, assume that the system already knows that the user went on a ski trip with a friend named Jon. When the system subsequently prompts the user with the question "What is the name of the person with whom you went on a ski trip?" the user answers "Jon Doe." Accordingly, in one or more embodiments of the invention, the fuzzy logic module 134 can apply fuzzy logic to this obtained information, in conjunction with the previously-stored user-provided information, and determine that the user answer of "Jon Doe" is truthful and/or accurate based on the first name ("Jon"), and the system can also learn a new fact about Jon's family name ("Doe"). This new fact can then be used as a basis for a subsequent challenge question.

If the authentication is successful, new information/facts will be added by the learning module 130 to the dynamic information database 106. The new information can be derived both from the user-responses to the dynamic questions and from the user-responses to the information-gathering/feedback questions.

Figure 6:
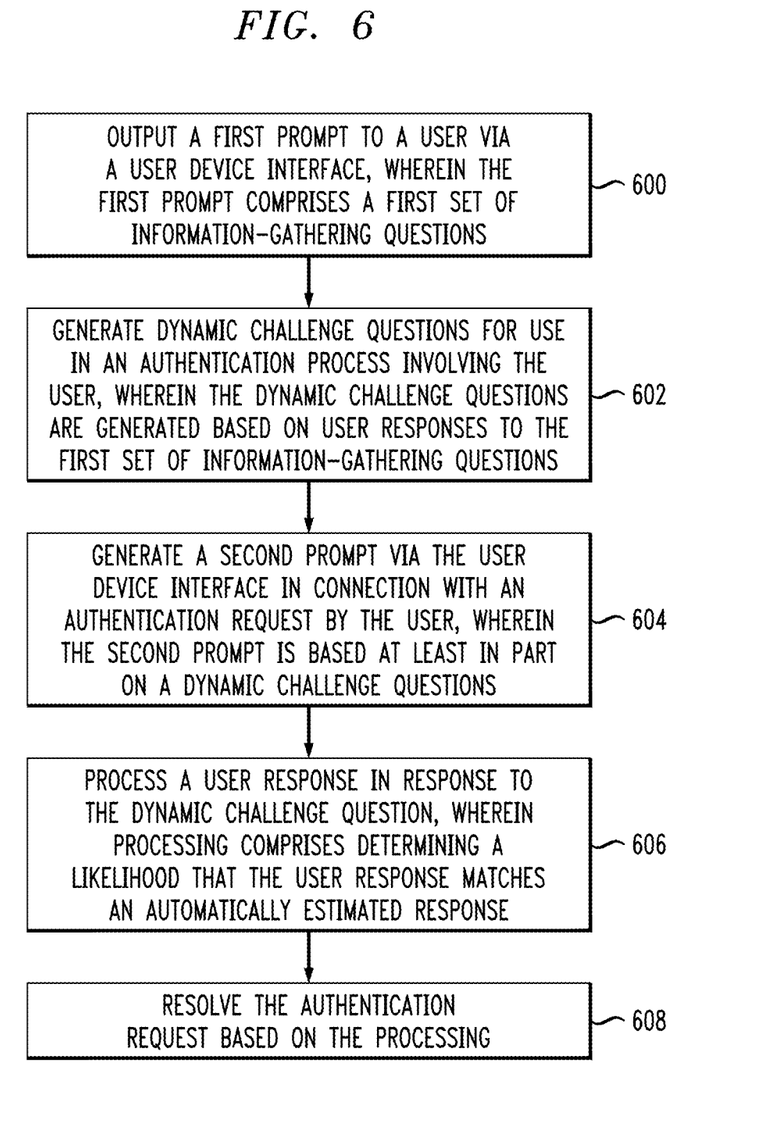
FIG. 6 is a flow diagram of a process for generating dynamic challenge questions in an illustrative embodiment.

FIG. 6 is a flow diagram of a process for automatically generating dynamic challenge questions for use in an authentication process in an illustrative embodiment. It is to be understood that this particular process is only an example, and additional or alternative processes can be carried out in other embodiments.

In this embodiment, the process includes steps 600 through 608. These steps are assumed to be performed by the processor 120 utilizing its modules 130, 132, and 134.

Step 600 includes outputting a first prompt to a user via at least one user device interface, wherein the first prompt comprises a first set of one or more information-gathering questions, wherein user responses to the first set of one or more information-gathering questions are unknown. At least one embodiment of the invention can also include storing the one or more user responses to the first set of one or more information-gathering questions in a database.

Step 602 includes generating one or more dynamic challenge questions for use in an authentication process involving the user, wherein the one or more dynamic challenge questions are generated based on one or more user responses to the first set of one or more information-gathering questions.

Step 604 includes generating a second prompt via the at least one user device interface in connection with an authentication request by the user to access a protected resource associated with the user device, wherein the second prompt is based at least in part on at least one of the one or more dynamic challenge questions. In one or more embodiments of the invention, the second prompt can be further based at least in part on a second set of one or more information-gathering questions, wherein user responses to the second set of one or more information-gathering questions are unknown. Additionally, at least one embodiment of the invention can also include storing one or more user responses to the second set of one or more information-gathering questions in a database.

Step 606 includes processing at least one user response entered via the user device interface in response to the at least one dynamic challenge question, wherein said processing comprises determining a likelihood that the at least one user response matches at least one automatically estimated response. Processing can include applying fuzzy logic to the at least one user response.

Step 608 includes resolving the authentication request based on said processing. Resolving can include denying access to the protected resource associated with the user device if the determined likelihood fails to exceed a pre-established threshold value. Resolving can also include granting access to the protected resource associated with the user device if the determined likelihood exceeds a pre-established threshold value. Additionally, one or more embodiments of the invention can include, subsequent to granting access to the protected resource, storing the at least one user response to the at least one dynamic challenge question in a database. Further, such an embodiment can also include generating one or more additional dynamic challenge questions for use in an additional authentication process involving the user, wherein the one or more additional dynamic challenge questions are generated based at least in part on the one or more user responses to the first set of one or more information-gathering questions, and the at least one user response to the at least one dynamic challenge question.

Such an embodiment can additionally include outputting a third prompt via the at least one user device interface in connection with an additional authentication request by the user to access a protected resource associated with the user device, wherein the third prompt is based at least in part on at least one of the one or more additional dynamic challenge questions. In one or more embodiments of the invention, the third prompt can be further based at least in part on a third set of one or more information-gathering questions, wherein user responses to the third set of one or more information-gathering questions are unknown. Additionally, at least one embodiment of the invention can also include storing one or more user responses to the third set of one or more information-gathering questions in a database, and processing at least one user response entered via the user device interface in response to the at least one additional dynamic challenge question, wherein said processing comprises determining a likelihood that the at least one user response to the at least one additional dynamic challenge question matches at least one automatically estimated response. Such processing can include, for example, applying fuzzy logic to the at least one user response to the at least one additional dynamic challenge question. Moreover, such an embodiment can further include resolving the additional authentication request based on said processing of the at least one user response to the at least one additional dynamic challenge question.

Accordingly, the particular processing operations and other network functionality described in conjunction with the flow diagram of FIG. 6 are presented by way of illustrative example only, and should not be construed as limiting the scope of the invention in any way. Alternative embodiments can use other types of processing operations to detect session-based access anomalies and undertake appropriate remediation actions. For example, the ordering of the process steps may be varied in other embodiments, or certain steps may be performed concurrently with one another rather than serially. Also, as indicated previously, the process steps or subsets thereof may be repeated periodically in conjunction with respective distinct instances of session-based anomaly detection for different user identifiers.

The above-described illustrative embodiments provide significant advantages relative to conventional approaches that rely on static questions and responses.

For example, some embodiments are configured to provide dynamic varied questions for each distinct authentication process, building from user-provided information and user-responses to previous dynamic challenge questions.

These and other embodiments can effectively preclude the need for a static bank of questions and responses that can create security vulnerabilities.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems such as Amazon Web Services (AWS), Google Cloud Platform (GCP) and Microsoft Azure. Virtual machines provided in such systems can be used to implement at least portions of one or more of a computer system and a content addressable storage system in illustrative embodiments. These and other cloud-based systems in illustrative embodiments can include object stores such as Amazon S3, GCP Cloud Storage, and Microsoft Azure Blob Storage.

In some embodiments, the cloud infrastructure additionally or alternatively comprises a plurality of containers implemented using container host devices. For example, as detailed herein, a given container of cloud infrastructure illustratively comprises a Docker container or other type of Linux container (LXC). The containers may run on virtual machines in a multi-tenant environment, although other arrangements are possible. The containers may be utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. Although described in the context of system 100, these platforms may also be used to implement at least portions of other information processing systems in other embodiments.

Figure 7:
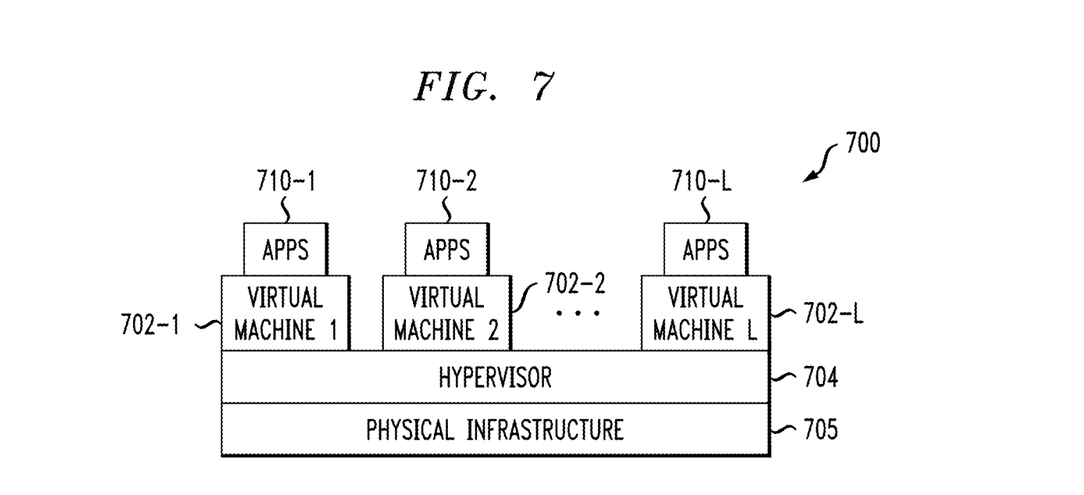
FIGS. 7 and 8 show examples of processing platforms that may be utilized to implement at least a portion of an information processing system in illustrative embodiments.
Figure 8:
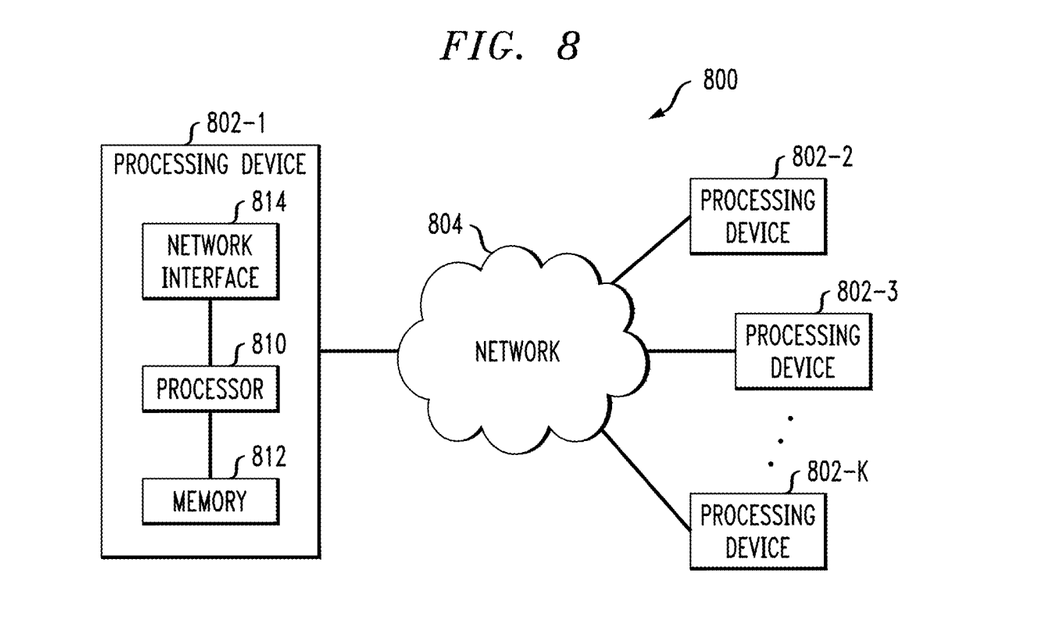

FIG. 7 shows an example processing platform comprising cloud infrastructure 700. The cloud infrastructure 700 comprises a combination of physical and virtual processing resources that may be utilized to implement at least a portion of the information processing system 100. The cloud infrastructure 700 comprises VMs 702-1, 702-2, . . . 702-L implemented using a hypervisor 704. The hypervisor 704 runs on physical infrastructure 705. The cloud infrastructure 700 further comprises sets of applications 710-1, 710-2, . . . 710-L running on respective ones of the virtual machines 702-1, 702-2, . . . 702-L under the control of the hypervisor 704.

Although only a single hypervisor 704 is shown in the embodiment of FIG. 7, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a commercially available hypervisor platform that may be used to implement hypervisor 704 and possibly other portions of the information processing system 100 in one or more embodiments is the VMware® vSphere® which may have an associated virtual infrastructure management system such as the VMware® vCenter™. The underlying physical machines may comprise one or more distributed processing platforms that include one or more storage systems.

As is apparent from the above, one or more of the processing modules or other components of system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, . . . 802-K, which communicate with one another over a network 804.

The network 804 may comprise any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 802-1 in the processing platform 800 comprises a processor 810 coupled to a memory 812.

The processor 810 may comprise a microprocessor, a microcontroller, an application-specific integrated circuit (ASIC), a field-programmable gate array (FPGA) or other type of processing circuitry, as well as portions or combinations of such circuitry elements.

The memory 812 may comprise random access memory (RAM), read-only memory (ROM) or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals.

Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include VNX® and Symmetrix VMAX® storage arrays, software-defined storage products such as ScaleIO™ and ViPR®, all-flash and hybrid flash storage arrays such as Unity™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. For example, the disclosed techniques are applicable to a wide variety of other types of information processing systems in which it is desirable to provide secure authentication processes. Also, the particular configurations of system and device elements and associated processing operations illustratively shown in the drawings can be varied in other embodiments. Thus, for example, the particular types of processing platforms, modules, cloud-based systems and virtual resources deployed in a given embodiment and their respective configurations may be varied. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A computer-implemented method for generating one or more dynamic challenge questions for use in an authentication process, the method comprising:

outputting a first prompt to a user via at least one user device interface, wherein the first prompt comprises a first set of one or more information-gathering questions, wherein a correct answer to the one or more information-gathering questions is unknown before the first prompt is outputted, and user responses to the first set of the one or more information-gathering questions include a direct answer and an additional item of information to at least one information gathering question of the one or more information gathering questions;

generating one or more dynamic challenge questions for use in an authentication process involving the user, wherein the one or more dynamic challenge questions are generated based on one or more user responses to the first set of one or more information-gathering questions;

generating a second prompt via the at least one user device interface in connection with an authentication request by the user to access a protected resource associated with the user device, wherein the second prompt is based at least in part on (i) at least one of the one or more dynamic challenge questions and (ii) a second set of one or more information-gathering questions, wherein user responses to the second set of one or more information-gathering questions are unknown, and wherein the second set of one or more information-gathering questions is generated based on one or more user responses to the first set of one or more information-gathering questions including the one or more new items of information:

processing at least one user response entered via the user device interface in response to the at least one dynamic challenge question, wherein said processing comprises determining a likelihood that the at least one user response matches at least one automatically estimated response;

resolving the authentication request based on said processing;

subsequent to resolving the authentication request, generating one or more additional dynamic challenge questions for use in an additional authentication request by the user to access the protected resource, wherein the one or more additional dynamic challenge questions are generated based at least in part on deriving new user-related information from (i) the one or more user responses to the first set of one or more information-gathering questions (ii) the at least one user response to the at least one dynamic challenge question generated in connection with the resolved authentication request and (iii) one or more user responses to the second set of one or more information-gathering questions: and outputting a third prompt via the at least one user device interface in connection with the additional authentication request by the user to access the protected resource, wherein the third prompt is based at least in part on at least one of the one or more additional dynamic challenge questions;

wherein the method is performed by at least one processing device comprising a processor coupled to a memory.

2. The computer-implemented method of claim 1, wherein said processing comprises applying fuzzy logic to the at least one user response.

3. The computer-implemented method of claim 1, further comprising:
storing one or more user responses to the second set of one or more information-gathering questions in a database.

4. The computer-implemented method of claim 1, further comprising:
storing the one or more user responses to the first set of one or more information-gathering questions in a database.

5. The computer-implemented method of claim 1, wherein said resolving comprises granting access to the protected resource associated with the user device if the determined likelihood exceeds a pre-established threshold value.

6. The computer-implemented method of claim 5, further comprising:
subsequent to said granting access to the protected resource, storing the at least one user response to the at least one dynamic challenge question in a database.

7. The computer-implemented method of claim 1, wherein the third prompt is further based at least in part on a third set of one or more information-gathering questions, wherein user responses to the third set of one or more information-gathering questions are unknown.

8. The computer-implemented method of claim 7, further comprising:
storing one or more user responses to the third set of one or more information-gathering questions in a database.

9. The computer-implemented method of claim 1, further comprising:
processing at least one user response entered via the user device interface in response to the at least one additional dynamic challenge question, wherein said processing comprises determining a likelihood that the at least one user response to the at least one additional dynamic challenge question matches at least one automatically estimated response.

10. The computer-implemented method of claim 9, wherein said processing comprises applying fuzzy logic to the at least one user response to the at least one additional dynamic challenge question.

11. The computer-implemented method of claim 9, further comprising:
resolving the additional authentication request based on said processing of the at least one user response to the at least one additional dynamic challenge question.

12. A non-transitory processor-readable storage medium having stored therein program code of one or more software programs, wherein the program code when executed by at least one processing device causes said at least one processing device:
to output a first prompt to a user via at least one user device interface, wherein the first prompt comprises a first set of one or more information-gathering questions, wherein a correct answer to the one or more information-gathering questions is unknown before the first prompt is outputted, and user responses to the first set of the one or more information-gathering questions include a direct answer and an additional item of information to at least one information gathering question of the one or more information gathering questions;

to generate one or more dynamic challenge questions for use in an authentication process involving the user, wherein the one or more dynamic challenge questions are generated based on one or more user responses to the first set of one or more information-gathering questions;

to generate a second prompt via the at least one user device interface in connection with an authentication request by the user to access a protected resource associated with the user device, wherein the second prompt is based at least in part on (i) at least one of the one or more dynamic challenge questions and (ii) a second set of one or more information-gathering questions, wherein user responses to the second set of one or more information-gathering questions are unknown, and wherein the second set of one or more information-gathering questions is generated based on one or more user responses to the first set of one or more information-gathering questions including the one or more new items of information:

to process at least one user response entered via the user device interface in response to the at least one dynamic challenge question, wherein said processing comprises determining a likelihood that the at least one user response matches at least one automatically estimated response;

to resolve the authentication request based on said processing;

subsequent to resolving the authentication request, to generate one or more additional dynamic challenge questions for use in an additional authentication request by the user to access the protected resource, wherein the one or more additional dynamic challenge questions are generated based at least in part on deriving new user-related information from (i) the one or more user responses to the first set of one or more information-gathering questions (ii) the at least one user response to the at least one dynamic challenge question generated in connection with the resolved authentication request and (iii) one or more user responses to the second set of one or more information-gathering questions: and;

to output a third prompt via the at least one user device interface in connection with the additional authentication request by the user to access the protected resource, wherein the third prompt is based at least in part on at least one of the one or more additional dynamic challenge questions.

13. The non-transitory processor-readable storage medium of claim 12, wherein said processing comprises applying fuzzy logic to the at least one user response.

14. The non-transitory processor-readable storage medium of claim 12, wherein said resolving comprises granting access to the protected resource associated with the user device if the determined likelihood exceeds a pre-established threshold value.

15. The non-transitory processor-readable storage medium of claim 12, wherein the third prompt is further based at least in part on a third set of one or more information-gathering questions, wherein user responses to the third set of one or more information-gathering questions are unknown.

16. An apparatus comprising:

at least one processing device comprising a processor coupled to a memory;

said at least one processing device being configured:

to output a first prompt to a user via at least one user device interface, wherein the first prompt comprises a first set of one or more information-gathering questions, wherein a correct answer to the one or more information-gathering questions is unknown before the first prompt is outputted, and user responses to the first set of the one or more information-gathering questions include a direct answer and an additional item of information to at least one information gathering question of the one or more information gathering questions;

to generate one or more dynamic challenge questions for use in an authentication process involving the user, wherein the one or more dynamic challenge questions are generated based on one or more user responses to the first set of one or more information-gathering questions;

to generate a second prompt via the at least one user device interface in connection with an authentication request by the user to access a protected resource associated with the user device, wherein the second prompt is based at least in part on (i) at least one of the one or more dynamic challenge questions and (ii) a second set of one or more information-gathering questions, wherein user responses to the second set of one or more information-gathering questions are unknown, and wherein the second set of one or more information-gathering questions is generated based on one or more user responses to the first set of one or more information-gathering questions including the one or more new items of information:

to process at least one user response entered via the user device interface in response to the at least one dynamic challenge question, wherein said processing comprises determining a likelihood that the at least one user response matches at least one automatically estimated response;

to resolve the authentication request based on said processing;

subsequent to resolving the authentication request, to generate one or more additional dynamic challenge questions for use in an additional authentication request by the user to access the protected resource, wherein the one or more additional dynamic challenge questions are generated based at least in part on deriving new user-related information from (i) the one or more user responses to the first set of one or more information-gathering questions, and (ii) the at least one user response to the at least one dynamic challenge question generated in connection with the resolved authentication request and (iii) one or more user responses to the second set of one or more information-gathering questions: and to output a third prompt via the at least one user device interface in connection with the additional authentication request by the user to access the protected resource, wherein the third prompt is based at least in part on at least one of the one or more additional dynamic challenge questions.

17. The apparatus of claim 16, wherein said processing comprises applying fuzzy logic to the at least one user response.

18. The apparatus of claim 16, wherein said resolving comprises granting access to the protected resource associated with the user device if the determined likelihood exceeds a pre-established threshold value.

19. The apparatus of claim 16, wherein the third prompt is further based at least in part on a third set of one or more information-gathering questions, wherein user responses to the third set of one or more information-gathering questions are unknown.

20. The apparatus of claim 16, wherein said at least one processing device is further configured: to process at least one user response entered via the user device interface in response to the at least one additional dynamic challenge question, wherein said processing comprises determining a likelihood that the at least one user response to the at least one additional dynamic challenge question matches at least one automatically estimated response.

* * * * *